(12) United States Patent
Kimura et al.

(10) Patent No.: US 8,578,220 B2
(45) Date of Patent: Nov. 5, 2013

(54) ELECTRONIC DEVICE, INFORMATION PROCESSING SYSTEM, METHOD OF NOTIFICATION OF A FAULT OF AN ELECTRONIC DEVICE, AND FAULT NOTIFICATION PROGRAM

(75) Inventors: Yoshihiro Kimura, Kawasaki (JP); Ikuko Tachibana, Kawasaki (JP); Toshiaki Hayashi, Kawasaki (JP); Takashi Tanifuji, Kawasaki (JP); Yasutaka Tanikawa, Kawasaki (JP); Tomohiro Hikita, Sendai (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 12/694,919

(22) Filed: Jan. 27, 2010

(65) Prior Publication Data
US 2010/0223509 A1  Sep. 2, 2010

Related U.S. Application Data

(63) Continuation of application No. PCT/JP2007/064914, filed on Jul. 30, 2007.

(51) Int. Cl.
*G06F 11/00* (2006.01)

(52) U.S. Cl.
USPC ............. 714/57; 714/25; 714/46; 714/48

(58) Field of Classification Search
USPC ............. 714/25, 38.1, 39, 45, 46, 48, 57
See application file for complete search history.

(56) References Cited

U.S. PATENT DOCUMENTS

| | | | |
|---|---|---|---|
| 6,674,477 B1 | 1/2004 | Yamaguchi et al. | |
| 7,200,779 B1* | 4/2007 | Coss et al. | 714/48 |
| 2001/0025371 A1* | 9/2001 | Sato et al. | 717/4 |
| 2002/0069042 A1* | 6/2002 | Swoboda | 703/19 |
| 2002/0140960 A1 | 10/2002 | Ishikawa | |
| 2006/0143548 A1* | 6/2006 | DelRegno et al. | 714/48 |
| 2007/0174742 A1 | 7/2007 | Hikita et al. | |
| 2012/0185737 A1* | 7/2012 | Ishiou | 714/48 |

FOREIGN PATENT DOCUMENTS

| | | |
|---|---|---|
| JP | 11-163937 | 6/1999 |
| JP | 11-266314 | 9/1999 |
| JP | 2002-288097 | 10/2002 |
| JP | 2004-7461 | 1/2004 |

(Continued)

OTHER PUBLICATIONS

Japanese Office Action issued Feb. 28, 2012 in corresponding Japanese Patent Application No. 2009-525215.

*Primary Examiner* — Joseph D Manoskey
(74) *Attorney, Agent, or Firm* — Staas & Halsey LLP

(57) ABSTRACT

An information processing system includes an electronic device and an information processing unit. The electronic device includes a fault detection unit; a data generating unit for generating, as data, the content of the detected fault; a data dividing unit for dividing the generated data into plural division data in the case where the data exceeds a predetermined capacity; a data compression unit for compressing each of the plural division data; an identification information adding unit for adding identification information to each of the plural compressed division data; and a data transmission unit for transmitting the plural compressed division data with the identification information. The information processing unit includes a data receiving unit for receiving the plural compressed division data, and a data restoration unit for restoring the plural compressed division data into original data based on the identification information.

10 Claims, 11 Drawing Sheets

(56) References Cited

FOREIGN PATENT DOCUMENTS

| | | |
|---|---|---|
| JP | 2004-227536 | 8/2004 |
| JP | 2005-134984 | 5/2005 |
| JP | 2005-209086 | 8/2005 |
| JP | 2006-293998 | 10/2006 |
| JP | 2007-108977 | 4/2007 |

* cited by examiner

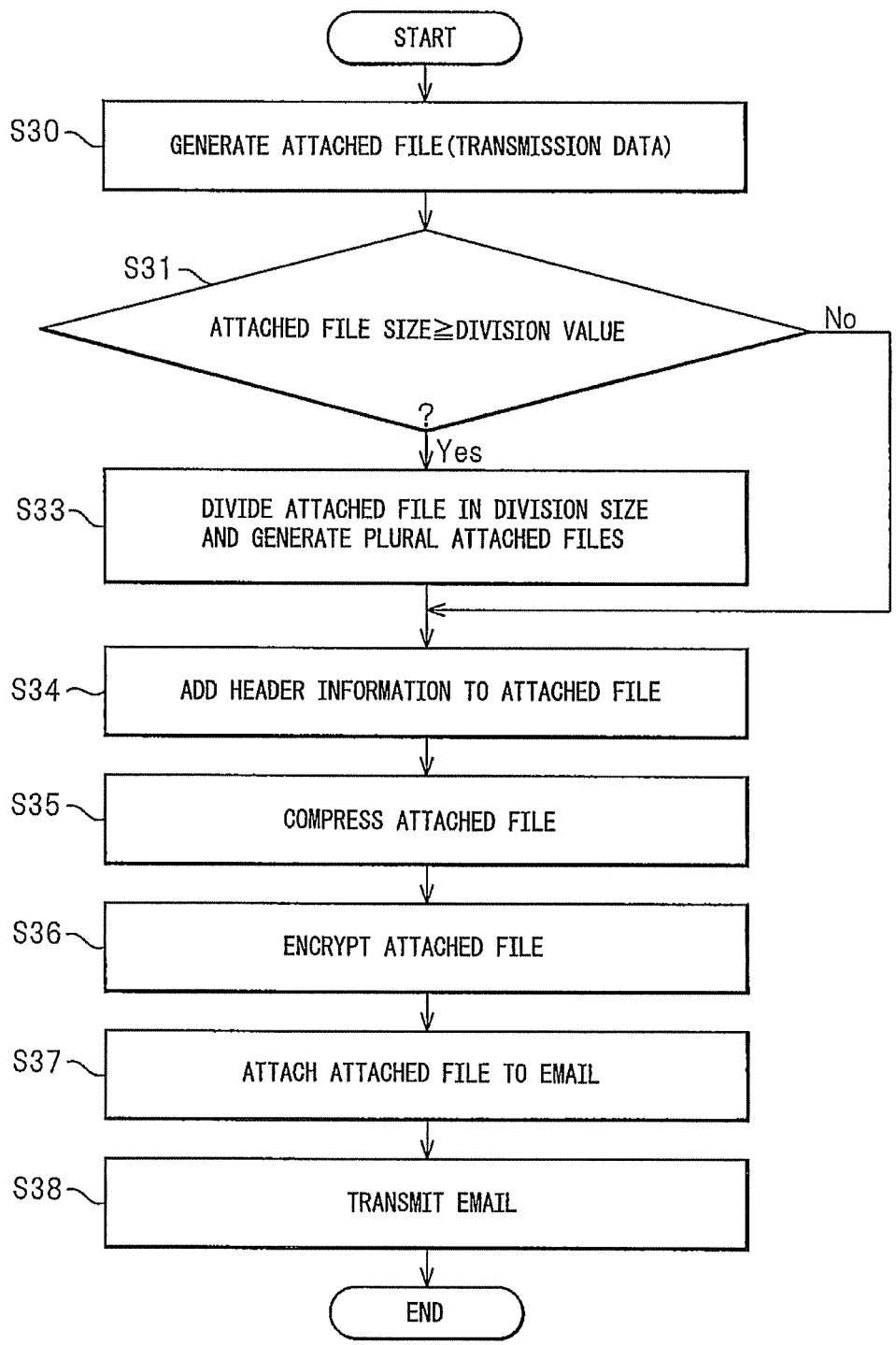

FIG. 10

CONTENT OF HEADER INFORMATION — HI

| ITEM | DESCRIPTION | |
|---|---|---|
| FAULT OCCURRENCE DATE/TIME | | FAULT SUMMARY INFORMATION *USABLE ALSO TO SPECIFY SAME DATA IN SAME DEVICE FROM PLURAL DATA. |
| FAULT SOURCE DEVICE | MACHINE NO., ETC. OF DEVICE | |
| NOTIFICATION SERIAL NO. | NUMBER ATTACHED FOR EACH NOTIFICATION IN DEVICE | |
| DEGREE OF EMERGENCY | HIGH/MIDDLE/LOW ERROR/WARNING/INFORMATION, ETC. | |
| CONTENT OF MESSAGE | MESSAGE INDICATING OUTLINE OF FAULT/NOTICE | |
| ORIGINAL DIVIDED FILE NAME | | DIVISION FILE RESTORATION INFORMATION |
| ORDER | INDICATE NUMBER COUNTED FROM FIRST DIVISION DATA | |
| NUMBER OF DIVISIONS | TOTAL NUMBER OF DIVISIONS | |

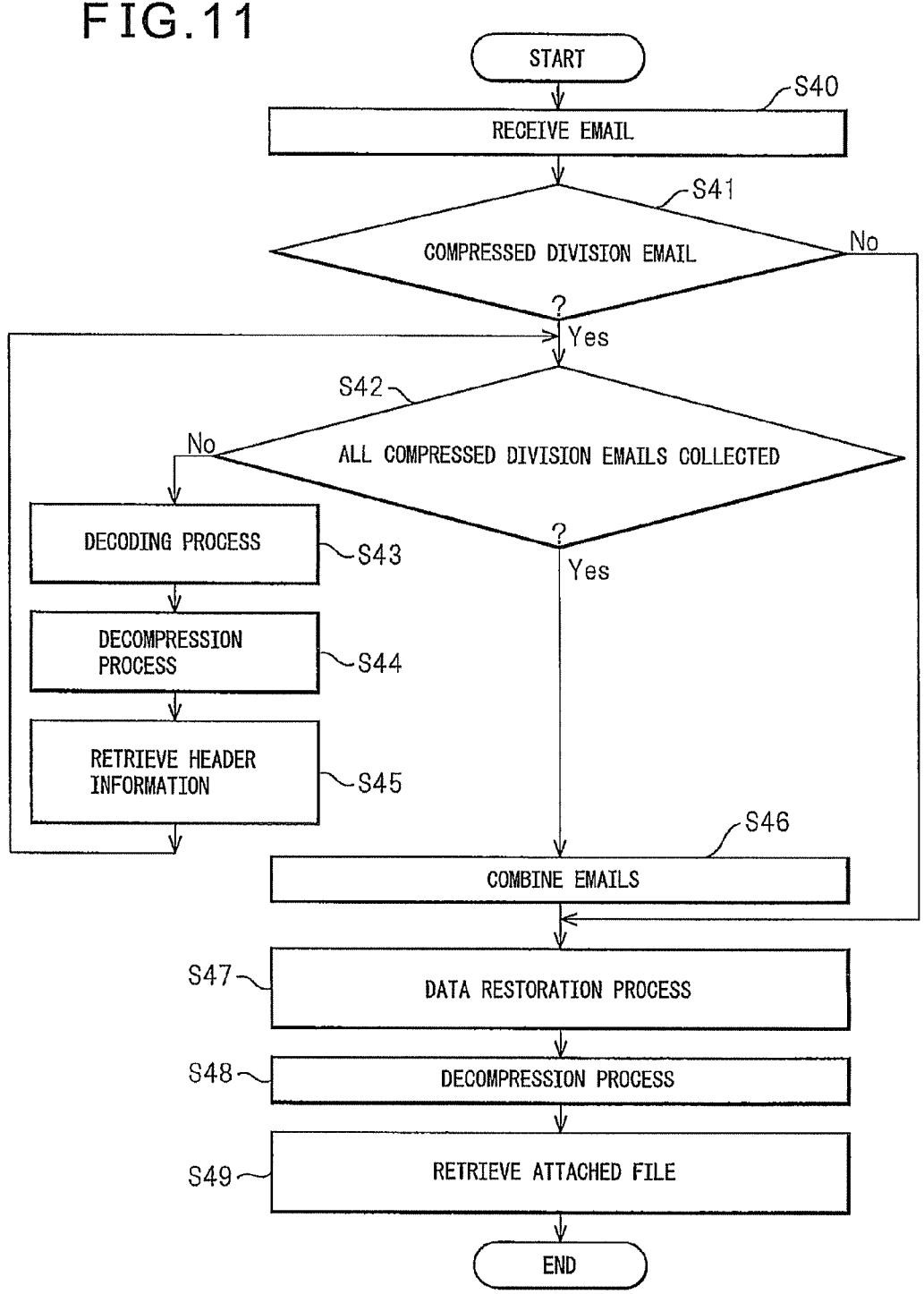

ELECTRONIC DEVICE, INFORMATION PROCESSING SYSTEM, METHOD OF NOTIFICATION OF A FAULT OF AN ELECTRONIC DEVICE, AND FAULT NOTIFICATION PROGRAM

CROSS-REFERENCE TO RELATED APPLICATIONS

This application is a continuation of PCT/JP2007/064914, filed on Jul. 30, 2007, the entire contents of which are incorporated herein by reference.

FIELD

This invention relates to an electronic device which, upon detection of a fault occurring in hardware, etc., used by a user, has a function of transmitting a fault notification email to an information processing unit such as a maintenance center device, an information processing system including the electronic device and the information processing unit, a method of notification of the fault of the electronic device and a fault notification program.

BACKGROUND

A conventional remote maintenance system is known as an information processing system having the function of notifying a fault that has occurred in the user device to the maintenance center device, in which upon detection of a fault of the user device, the fault information is notified to the maintenance center device by electronic mail (email) through a network, such as the Internet and the maintenance center device diagnoses the environment of the user device based on the email transmission thereby providing the proper maintenance service.

In this conventional remote maintenance system, the monitor agent is packaged in the user device as software for monitoring a hardware fault of the user device, and upon detection of a fault of the user device, transmits the fault occurrence to the maintenance center device at a remote place by email through a network, such as the Internet. The maintenance center device diagnoses the user device based on the email transmission, and based on the result of this diagnosis, notifies support personnel that the fault notice has been received from the user device. The support personnel who has received the fault notice confirms the content of the fault notice and travels to repair the user device with the required replacement parts, thereby making it possible to provide the proper maintenance service.

The maintenance center device is required to be supplied with not only the information notifying a fault, but also various other information including the log information required for the fault investigation to specify the faulty part and the fault point of the user device, the information on the software and hardware configuration and the information on the environment of the user device. The information (hereinafter referred to as the attached file) is so large in size (generally, several hundred kilobytes (KB) to several megabytes (MB)) that the size of the transmission of the email is limited depending on the email transmission environment of the user (for example, the tolerable maximum capacity of the email used by the user is set at 10 megabytes). In order to not exceed this size limit, therefore, the monitor agent of the user device is generally required to divide the attached file to generate a plurality of divided files and carry out the mail transmission in a plurality of divided emails with the divided files attached thereto. In the process, the attached file is compressed to minimize the size thereof, and further, in order to prevent the leakage of the information exclusive to the user, encrypted before being divided.

In the maintenance center device, a plurality of divided emails transmitted from the monitor agent are received separately from each other, and when all of the divided emails are collected, combined with each other and after decryption and decompression, the original file is retrieved.

This conventional division email transmission method for the remote maintenance system; however, poses problems (1) and (2) described below.

(1) A part of the plurality of the division emails may fail to reach the maintenance center device due to a fault in the network.

(A) With the size reduction of each division email and the resultant increase in the number of the division emails, a part of the divided emails may be lost with a higher probability.

(B) In accordance with the RFC (Request for Comments; documents for standards edited by IETF (Internet Engineering Task Force)) agreement, information such as "Content-Type: message/partial" (indicating that a particular email is a part of the plurality of divided mails) is normally added to the email header of each of a plurality of divided emails. Since each division email constitutes only a part of the attached file, virus scan cannot be performed. As a result, the transmission of the divided emails (with the information such as "Content-Type: message/partial" added thereto) is sometimes rejected or the attached file of the divided email may be replaced with a warning text in the antivirus gateway (GW) introduced into the customer environment, with the result that a part of the plurality of the divided emails may fail to reach the maintenance center device or, in spite of the arrival of a part of the divided emails, the original attached file often cannot be restored.

According to a method conceived to avoid the aforementioned problem, a plurality of divided emails are generated by dividing the attached file without using the information such as the message/partial stipulated by RFC against the divided emails. In this method, the plurality of the divided emails are not treated as divided emails by the antivirus gateway, and therefore, checked for a virus and spam (i.e., junk mail or the like sent at random without regard to the intention of the receiver) check in the normal way. In this case, however, each divided email, compressed and encrypted, is binary data. Therefore, a character string which is to be formed in the binary data may be erroneously recognized as a virus or spam, with the result that the divided email may be rejected by the antivirus gateway.

(2) In the remote maintenance system, it is important to quickly judge whether the divided email sent thereto is the information on a fault of the user device or the simple information on other than a fault (for example, the information on the hardware or software configuration, etc.), and in the case where the email concerns the fault information, to take an appropriate action immediately. Before the arrival of the plurality of divided emails, however, the original attached file cannot be retrieved, and therefore, the content of a fault developed in the user device or the user device constituting a fault source cannot be identified. Thus, the degree of emergency cannot be determined for the information sent thereto.

Patent Documents 1 to 3 relating to the divided email transmission method for the conventional remote maintenance system are described below for reference.

Patent Document 1 discloses a technique for information transmission method through a computer network, in which the information to be transmitted is divided into a plurality of pieces, and by attaching header information including identification information indicating the association with the same group and the serial number indicating the order to each of the pieces of information, is transmitted by email.

The technique disclosed in Patent Document 1, however, is nothing but the description of the process of transmitting each of the plurality of divided information by adding thereto the identification information indicating the association with the same group and the serial number indicating the order of transmission, and fails to refer to the transmission of each division information by adding thereto the header information indicating the content of the fault occurrence notice. According to the technique disclosed in Patent Document 1, therefore, the original information transmitted cannot be retrieved before arrival of the plurality of divided information, so that neither the content of a fault in the original information transmitted nor the degree of emergency of the transmitted information can be determined at the time point when any one of the plurality of the divided information is received.

Patent Document 2, on the other hand, discloses a technique for an image transmission method in which the image data read by the scanner is divided into a plurality of image data, and by adding the email header indicating the position of each divided file to a plurality of divided files thus obtained, each divided file is sequentially transmitted by email.

Patent Document 2, however, describes only the process of transmitting each divided file by adding the email header indicating the position of each division file to each of the plurality of the division files, and fails to refer to the transmission of each divided file by adding thereto the header information indicating the content of the fault occurrence notice. According to the technique disclosed in Patent Document 2, the original image data cannot be retrieved before arrival of the plurality of the divided files, and therefore, the content of the fault of the original image cannot be identified when any one of the plurality of the divided files is received.

Patent Document 3 discloses a technique for the remote maintenance system in which upon detection of a fault in the user device by a monitor agent packaged in the user device, the attached file containing the fault information is divided into a plurality of data after being compressed and encrypted, and the resulting plurality of division data are transmitted by email to the maintenance center device. The maintenance center device, in turn, diagnoses the email transmission environment of the user device and transmits the diagnosis result to the user device by email.

Patent Document 3, however, describes only a configuration in which the attached file containing the fault information is divided into a plurality of divided data after compression and encryption, followed by transmission of each division, and fails to refer to the addition of the header information indicating the content of the fault notice to each division data. According to the technique disclosed in Patent Document 3, like those disclosed in Patent Documents 1 and 2, therefore, the original attached file cannot be retrieved before arrival of the plurality of the divided data. Therefore, the content of a fault developed in the user device, etc., and the degree of emergency of the attached file cannot be determined when any one of the plurality of the divided data is received.

In other words, none of the techniques disclosed in Patent Documents 1 to 3 can solve the problem encountered by the conventional divided mail transmission method.

Patent Document 1: Japanese Unexamined Patent Publication No. 11-163937

Patent Document 2: Japanese Unexamined Patent Publication No. 2002-288097

Patent Document 3: Japanese Unexamined Patent Publication No. 2007-108977

SUMMARY

An object of this invention is to provide an electronic device, an information processing system, a method of notifying a fault of the electronic device and a fault notification program wherein in the case where a plurality of division data obtained by dividing an attached file containing the information on a fault developed in a user device, etc., are transmitted to a maintenance center device or the like, the content of the fault developed in the user device and the emergency degree of the information can be determined when any one of the plurality of the division data reaches the maintenance center device.

In order to achieve this object, according to this invention, there is provided an electronic device comprising a fault detection means for detecting a fault, a data generating means for generating, as a data (attached file), the content of the fault detected by the fault detection means, a data dividing means for dividing the generated data, if exceeding a predetermined capacity, into a plurality of division data, a data compression means for compressing each of the plurality of the division data into a plurality of compressed division data, an identification information adding means for adding the identification information to each of the plurality of the compressed division data and a data transmission means for transmitting, through a network, each of the plurality of the compressed division data with the identification information added thereto.

Preferably, in the case where the plurality of compressed division data are transmitted, the data transmission means of the electronic device according to the invention adds the fault emergency degree information in the first transmission session.

Preferably, the electronic device according to the invention includes an encryption means for encrypting each of the plurality of the compressed division data.

Preferably, the identification information of the electronic device according to the invention includes the fault summary information summarizing the content of the fault.

Also, according to this invention, there is provided an information processing system comprising an electronic device for transmitting the detected fault information through a network and an information processing unit for collecting the fault information of the electronic device, wherein the electronic device includes a fault detection means for detecting a fault of the electronic device, a data generating means for generating, as a data (attached file), the content of the fault detected by the fault detection means, a data dividing means for dividing the generated data into a plurality of division data in the case where the data exceeds a predetermined capacity, a data compression means for compressing each of the plurality of the division data into a plurality of compressed division data, an identification information adding means for adding the identification information to each of the plurality of the compressed division data, and a data transmission means for transmitting, through a network, each of the plurality of the compressed division data with the identification information added thereto, and wherein the information processing unit includes a data receiving means for receiving each of the plurality of the compressed division data transmitted and a data restoration means for restoring the plurality of the compressed division data into one data based on the identification information.

Further, according to this invention, there is provided a method of notifying a fault of an electronic device to transmit the detected fault information through a network, comprising the step of detecting a fault of the electronic device, the step of generating the content of the detected fault as a data (attached file), the step of dividing the generated data into a plurality of division data in the case where the data exceeds a predetermined capacity, the step of compressing each of the plurality of the division data into a plurality of compressed division data, the step of adding the identification information to each of the plurality of the compressed division data, and the step of transmitting, through a network, each of the compressed division data with the identification information added thereto.

Preferably, in the method of notifying a fault of the electronic device according to the invention, the information on the emergency degree of the fault is added in the first session of transmission of the plurality of the compressed division data.

Further, according to this invention, there is provided a fault notification program for an electronic device having a processor to transmit the detected fault information through a network, comprising the step of detecting a fault of the electronic device, the step of generating a data (attached file) based on the content of the detected fault, the step of dividing the generated data into a plurality of division data in the case where the data exceeds a predetermined capacity, the step of compressing each of the plurality of the division data into a plurality of compressed division data, the step of adding the identification information to each of the plurality of the compressed division data, and the step of transmitting, through a network, each of the compressed division data with the identification information added thereto.

To summarize, in the electronic device, the information processing system and the fault notification method for the electronic device according to the invention, the attached file including the content of a fault (the information on the fault) detected by the electronic device such as a user device is divided into a plurality of division data of a predetermined size, and by adding the identification information indicating the information type, the summary of the content of the fault and the electronic device as a source of the fault to each of the plurality of the division data, each of the plurality of the division data with the identification information added thereto is transmitted through a network such as the Internet.

According to this invention, therefore, even in the case where the plurality of the division data is partially lost or delayed, or even in the case where the plurality of the division data are transmitted in a different order, the identification information is retrieved at the time point when any one of the plurality of the division data reaches an information processing unit of a maintenance center device, so that the summary of the content of the fault and the electronic device that has developed the fault can be quickly, accurately identified and the degree of emergency of the information can be judged, thereby making it possible to take an appropriate measure against the fault based on the identification information.

Furthermore, according to this invention, the possibility of erroneously detecting the plurality of the division data as a virus or a spam in an antivirus gateway or the like can be suppressed by combining the standard process of encrypting the plurality of the division data.

BRIEF DESCRIPTION OF THE DRAWINGS

This invention is explained below with reference to the accompanying drawings, in which:

FIG. 9 is a flowchart explaining the processing flow in the device at the transmitting end of the information processing system depicted in FIG. 6;

FIG. 10 is a data format diagram depicting the content of the header information used by the information processing system depicted in FIG. 6; and FIG. 11 is a flowchart explaining the processing flow in the device at the receiving end of the information processing system depicted in FIG. 6.

DESCRIPTION OF EMBODIMENTS

Before explaining the configuration and the processing flow of the information processing system and the electronic device according to this embodiment, the remote maintenance system and the division email transmission method according to the prior art and the problem points thereof are explained in detail with reference to the accompanying drawings (FIGS. 1 to 5).

Figure 1:
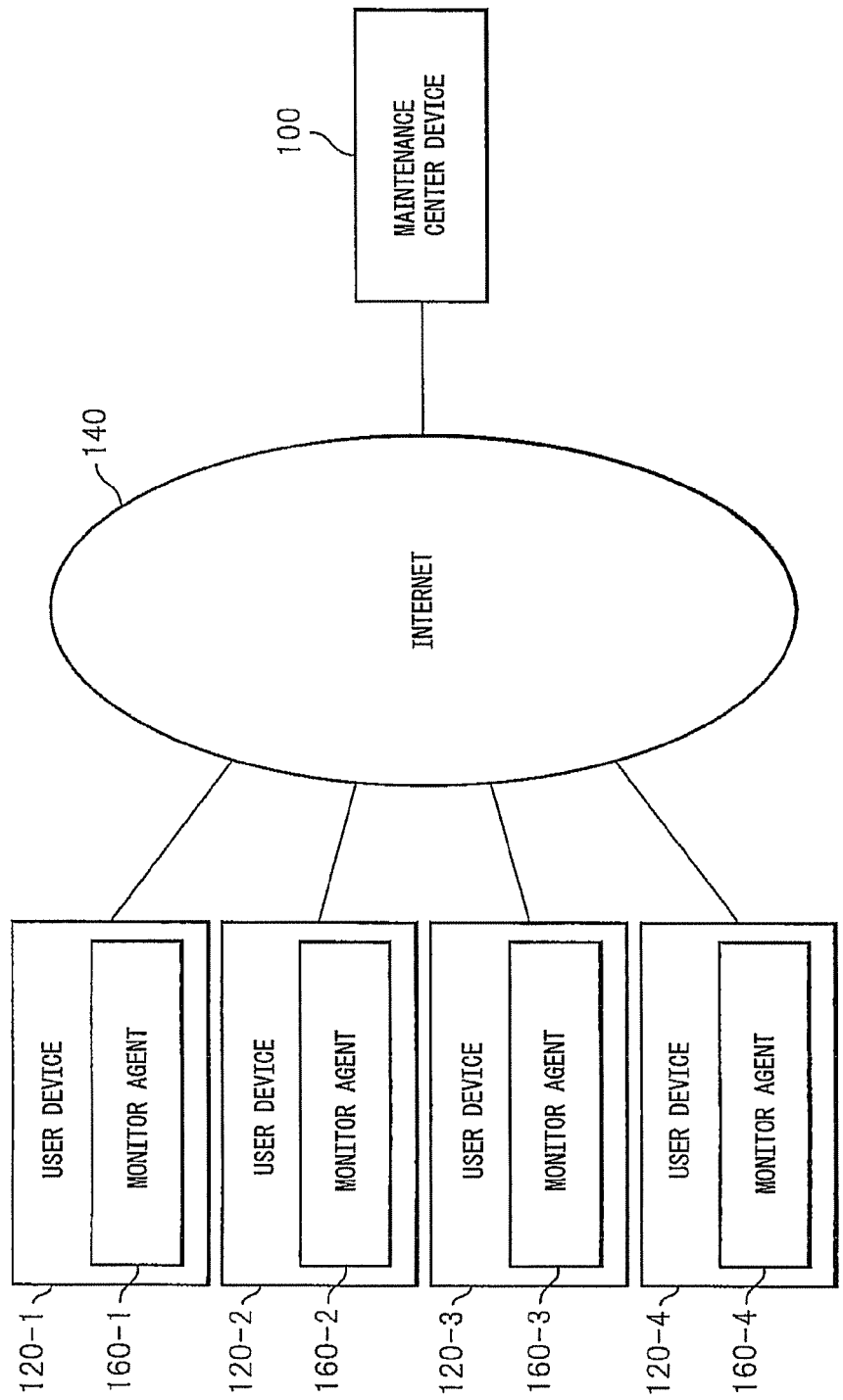
FIG. 1 is a block diagram depicting an example of the configuration of the conventional remote maintenance system.

FIG. 1 is a block diagram depicting an example of the configuration of the conventional remote maintenance system. Incidentally, in the description that follows, the component elements similar to those described above are designated by the same reference numerals, respectively.

In FIG. 1, a maintenance center device 100 installed in a maintenance center for providing the maintenance service is connected to user devices 120-1 to 120-4 of the users to which the maintenance service is provided through an internet 140.

As a conventional information processing system having the function of notifying a fault developed in a user device to the maintenance center device, etc., the conventional remote maintenance system as depicted in FIG. 1 is known in which upon detection of a fault in the user devices 120-1 to 120-4, the information on the fault is notified to the maintenance center device 100 by email through the internet 140 on the one hand, and the email transmission environment of the user devices 120-1 to 120-4 is diagnosed by the maintenance center device 100 on the other hand, thereby making it possible to provide the proper maintenance service.

More specifically, in the remote maintenance system depicted in FIG. 1, the user devices 120-1 to 120-4 installed on the user side are connected through the internet 140 to the maintenance center device 100 installed in the maintenance center for providing the maintenance service.

These user devices 120-1 to 120-4 are the information processing devices or the electronic devices such as computers and packaged with monitor agents 160-1 to 160-4 as the software to monitor a fault of the hardware such as the user devices 120-1 to 120-4. Once monitor agents 160-1 to 160-4 detect a fault in the user devices 120-1 to 120-4, the information notifying the fault occurrence is transmitted by email to the maintenance center device 100 at a remote place through the internet 140. In the maintenance center device 100, the content of the email is analyzed based on the result of reception of the email while at the same time diagnosing the e-mail transmission environment of the user devices 120-1 to 120-4. Based on the result of this diagnosis, the fact that the fault occurrence is notified from the user devices 120-1 to 120-4 is displayed and output for notifying the support personnel. Any of the support personnel who has received this fault occurrence notification confirms the content of the fault occurrence notification, and by carrying the required replacement parts, goes to repair the user devices 120-1 to 120-4 thereby to provide the proper maintenance service.

Normally, the maintenance center device 100 is required to be supplied with various information including the log information necessary for the fault investigation to specify the faulty part or the faulty point, the information on the hardware and software configuration and the information on the environment of the user device, as well as the information notifying the fault occurrence. The attached file containing all these information is so large in size that the size of the email to be sent may be set depending on the email transmission environment of the user. In the monitor agents 160-1 to 160-4, therefore, the attached file is normally divided into a plurality of division files not to exceed the size limit, and by attaching each of these division files to the email, the resultant plurality of division emails are transmitted. In the process, to minimize the size thereof, the attached file is compressed and further, after being encrypted, divided in order to prevent the leakage of the information exclusive to the user.

In the maintenance center device 100, a plurality of the division mails transmitted from the monitor agents 160-1 to 160-4 are received separately from each other, and once all the division emails are collected, they are combined, and after decryption and decompression, retrieved as the original attached file.

Figure 2:
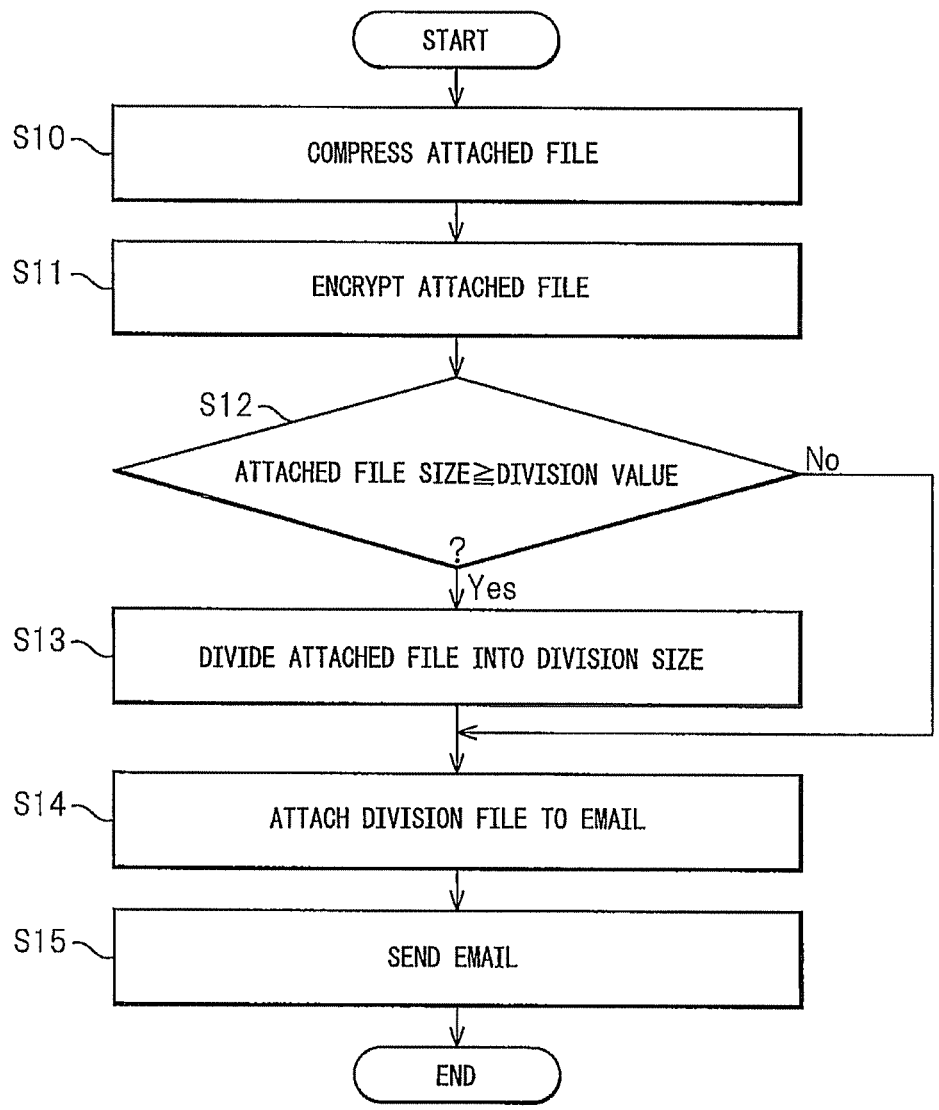
FIG. 2 is a flowchart explaining the processing flow in the monitor agent of the remote maintenance system depicted in FIG. 1.
Figure 3:
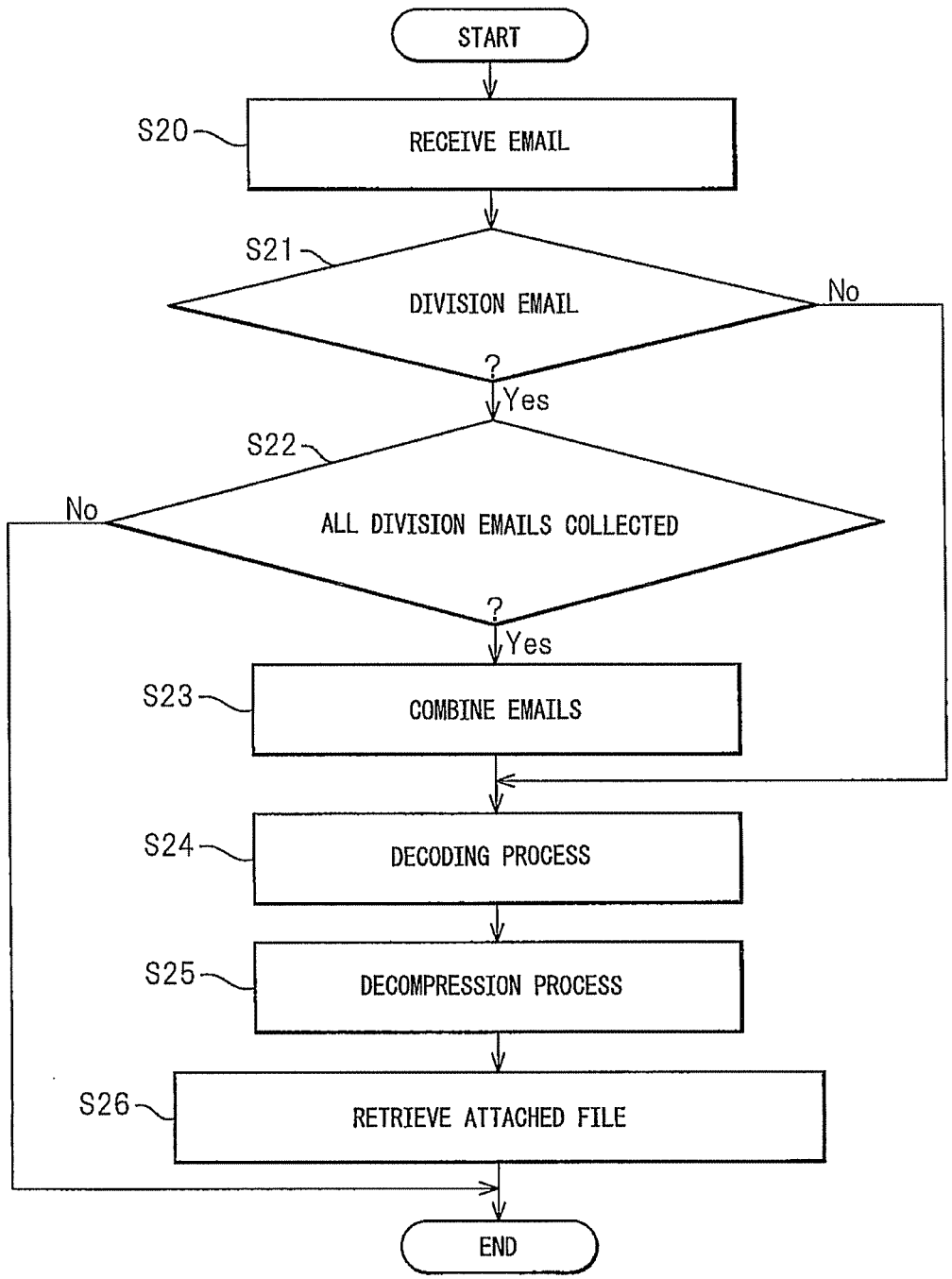
FIG. 3 is a flowchart explaining the processing flow in the maintenance center device of the remote maintenance system depicted in FIG. 1.

FIG. 2 is a flowchart explaining the processing flow in the monitor agents of the remote maintenance system depicted in FIG. 1, and FIG. 3 is a flowchart for explaining the processing flow in the maintenance center device of the remote maintenance system depicted in FIG. 1.

More specifically, the flowchart of FIG. 2 illustrates the processing flow of a division email transmission program executed on the CPU (central processing unit) of the computers making up the monitor agents 160-1 to 160-4 (FIG. 1), and the flowchart of FIG. 3 illustrates the processing flow of the program executed on the CPU of the computer making up the maintenance center device 100 (FIG. 1) to combine all the division mails.

In the flowchart of FIG. 2, as indicated by steps S10 and S11, the attached file containing the various information such as the information notifying the fault occurrence and the log information required for the fault investigation to specify the faulty part and the faulty point of the user device is compressed and encrypted.

Next, step S12 judges whether the size of the encrypted attached file is not less than a predetermined standard division value (size limit) or not. Upon judgment that the size of the encrypted attached file is not less than the standard division value, the process proceeds to step S13, in which the attached file is divided to generate a plurality of division files of the division size of the standard division value.

Further, as depicted in step S14, a plurality of division mails are generated by attaching each of the plurality of the division files to the mail.

Then, as depicted in step S15, a plurality of the division mails are sent to the maintenance center device by email thereby to accomplish the mail transmission.

Also, as depicted in step S20 of the flowchart of FIG. 3, on the other hand, the various types of emails sent from the monitor agents are received to accomplish the mail reception.

Next, step S21 judges whether the received email is a division email or not based on the mail header. Upon judgment that the received email is a division email, the process proceeds to step S22 to judge whether the plurality of the division emails are all received or not. Further, as depicted in step S23, once all of the division emails are received, they are combined to accomplish the email combining operation.

Further, as depicted in steps S24 and 525, the electronic mail obtained by combining all the division emails is decrypted and decompressed.

Finally, as depicted in step S26, the original attached file is retrieved from the electronic mail subjected to the decryption and decompression processes.

Figure 4:
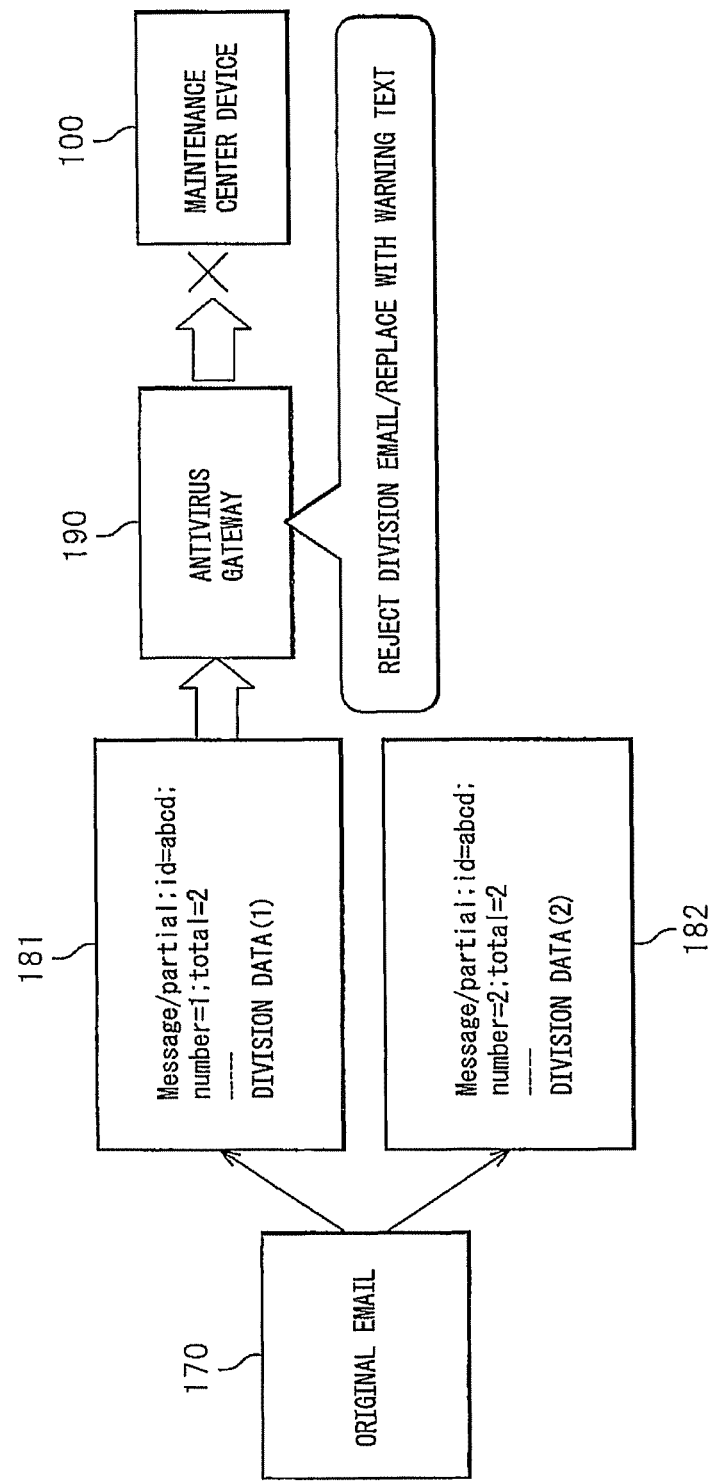
FIG. 4 is a data flowchart explaining the problem point of the division mail transmission method for the conventional remote maintenance system.
Figure 5:
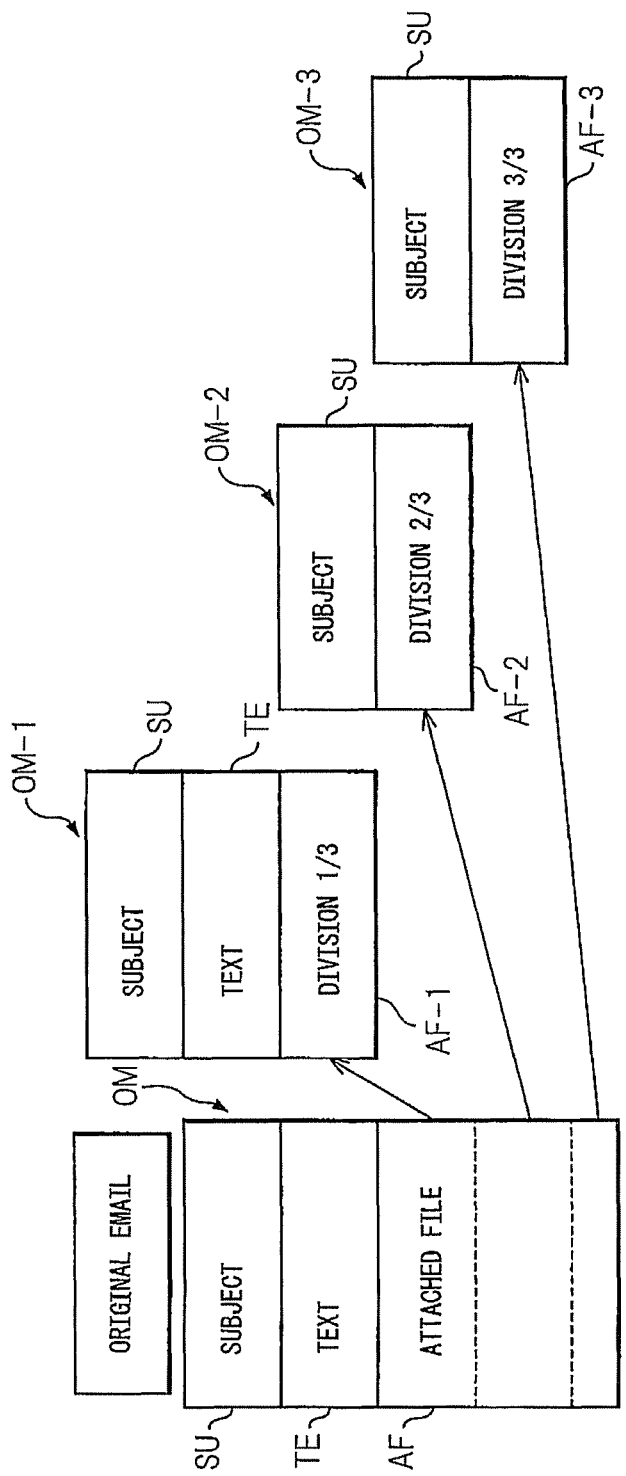
FIG. 5 is a data flowchart explaining the problem point of the division email transmission method using a subject.

FIG. 4 is a data flowchart explaining the problem points of the division mail transmission method for the conventional remote maintenance system, and FIG. 5 a data flowchart for explaining the problem points of the division email transmission method using a subject.

In the conventional remote maintenance system depicted in FIG. 1, the inconveniences described below occur in the case where, as described above, a plurality of division files are generated by dividing the attached file, and a plurality of division emails obtained by attaching each of the plurality of the division files to the corresponding email are transmitted.

Firstly, with the increase in the number of the division emails, a part of the division emails may be lost and fail to reach the maintenance center device 100 due to a network fault or the like which may occur.

Secondly, in the case where the original mail 170 (original attached file) is divided into a plurality of division emails as depicted in FIG. 4, for example, the information such as "Content-Type: message/partial" (indicating that a particular email is a part of a plurality of division emails), "id=abcd" (specifying the user device as a division source), "number=1" (indicating the number as counted from the first division email) and "total=2" (indicating the total number of division emails) is normally added to the mail header of each division email (for example, division data (1) 180, division data (2) 180) in accordance with the RFC agreement. In view of the fact that each division email is only a part of the original attached file, however, the virus scan cannot be carried out. In the antivirus gateway 190 introduced in the customer environment, therefore, the transmission of the division emails may be rejected by the division email filter function, or the attached file of the division email may be replaced with a warning text. As a result, a part of the plurality of the division emails may fail to reach the maintenance center device 100, or even though a part of the division emails reaches, the original attached file cannot be restored.

Thirdly, in the remote maintenance system, it is important to quickly check whether the division email sent in carries the information on the fault of the user device or the simple information other than the fault, and if it carries the fault information, an immediate action is required to be taken. Before all of the plurality of the division emails arrive, however, the original attached file cannot be retrieved, and the content of a fault, if any, or the user device that has developed the fault cannot identified nor is it possible to judge the degree of emergency of the information sent in.

To avoid this problem in the third case described above, a method has been conceivable to describe the information in the subject of each of the plurality of the division emails.

More specifically, as depicted in FIG. 5, these information are described in the subject SU of the original mail OM (including the attached file AF and the text TE) while at the same time describing the same information in the subject of each of the first division email OM-1 (including the division file (1/3) AF-1 and the text TE), the second division email OM-2 (including the division file (2/3) AF-2) and the third division email OM-3 (including the division file (3/3) AF-3). Since the information described in the subject SU is transmitted through the internet, however, the leakage of the information on the user device in the remote maintenance system is undesirably liable to be caused. Actually, therefore, it is not desirable to describe the information on the user device in the subject, and the information are required to be encrypted after being described in the attached file.

Next, the configuration and the flow of the process according to this embodiment conceived to avoid the aforementioned problem are explained in detail with reference to the accompanying drawings (FIGS. 6 to 11).

Figure 6:
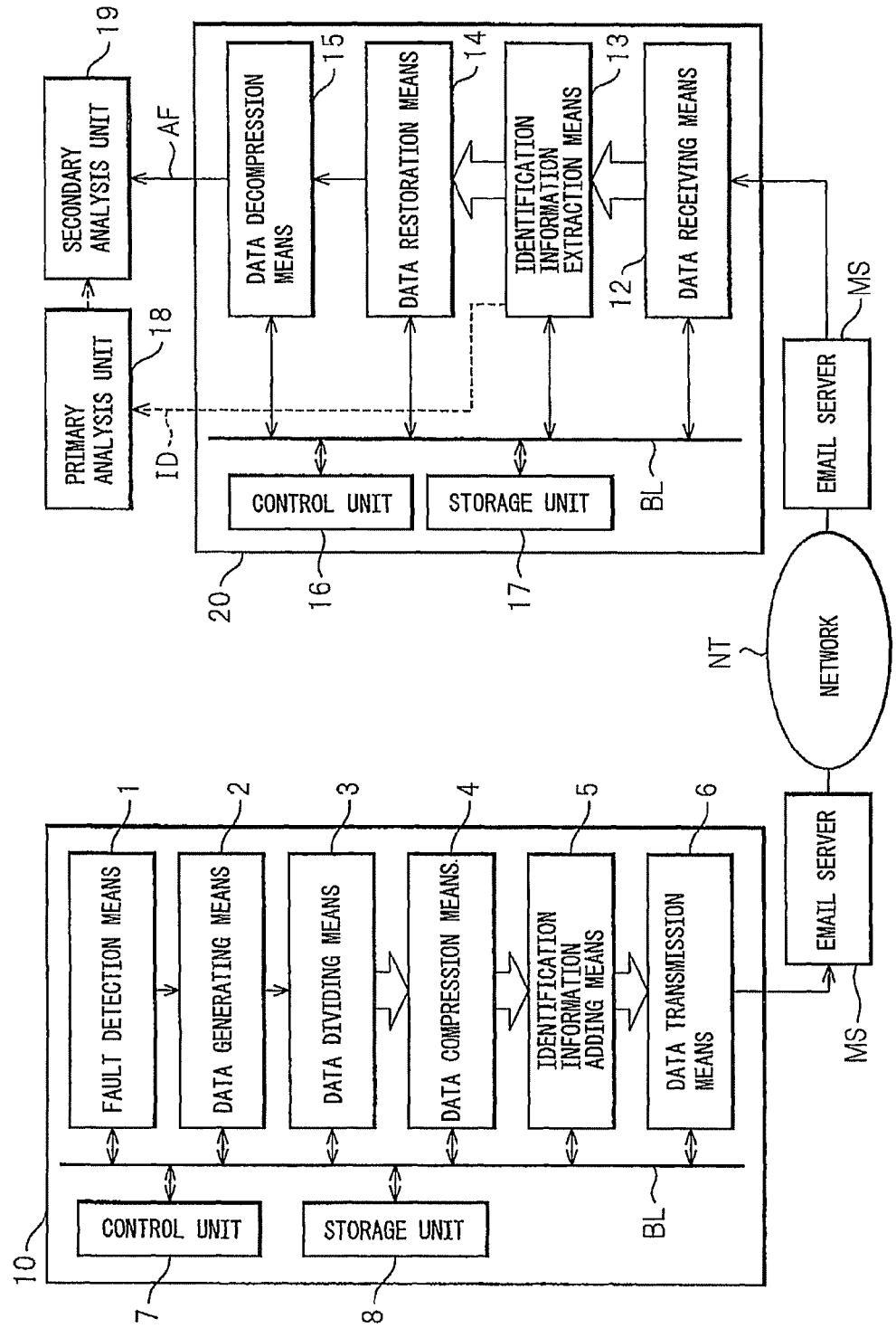
FIG. 6 is a block diagram depicting the configuration of the information processing system according to an example of the present embodiment.

FIG. 6 is a block diagram depicting the configuration of the information processing system according to this embodiment. An explanation is given on the simplified configuration of the information processing system according to this embodiment including the electronic device (corresponding to the device 10 at the transmitting end in FIG. 6) and the information processing unit (corresponding to the device 20 at the receiving end in FIG. 6) for receiving the information (a plurality of the division data) transmitted from the electronic device through the network N and restoring them into one data.

The information processing system according to the embodiment depicted in FIG. 6 includes: a device 10 (a user device, for example) at the transmitting end which detects a fault developed in the electronic device such as the user device, and by dividing the data (for example, the attached file) including the content of the fault (the information on the fault) into a plurality of division data, transmits the plurality of the division data through a network server MS and a network NT; and the device 20 (the maintenance center device, for example) constituting an information processing unit at the receiving end which restores the original data by collecting the plurality of the division data transmitted from the device 10 at the transmitting end and by confirming the content of the fault based on this data, provides the proper maintenance service quickly.

More specifically, the device 10 at the transmitting end depicted in FIG. 6 includes a fault detection means 1 for detecting a fault developed in the electronic device, a data generating means 2 for generating, as one data (attached file), the content of the fault detected by the fault detection means 1, and a data dividing means 3 for dividing the data generated by the data generating means 2 into a plurality of the division data in the case where the data exceeds a predetermined capacity. In the conventional remote maintenance system described above, the attached file containing the fault information is divided after being compressed and encrypted. According to this embodiment, however, it should be noted that a plurality of division data are generated by dividing the attached file into parts of a predetermined size before being compressed and encrypted.

Further, the device 10 at the transmitting end depicted in FIG. 6 includes a data compression means 4 for compressing each of the plurality of the division data into a plurality of compressed division data, an identification information adding means 5 for adding the identification information to each of the plurality of the compressed division data, and a data transmission means 6 for encrypting each of the compressed division data with the identification information added thereto and transmitting the resultant compressed division data by email through the network server NS and the network NT. Incidentally, instead of encrypting by adding the identification information to each of the plurality of the division data after compression as in the present case, the plurality of the division data and the identification information may be compressed and encrypted alternatively after adding the identification information to each of the plurality of the division data.

Preferably, the identification information added to each of the plurality of the compressed division data includes the fault summary information such as the type of the information transmitted (the information on the fault or the information on other than the fault), the information indicating the summary of the content of the fault, the information on the electronic device as a source of the fault and the information on the date/time of the fault occurrence.

More preferably, in the case where the plurality of the compressed division data are transmitted by email, the information indicating the emergency degree of the fault can be added in the first session of mail transmission.

Further, the device 10 at the transmitting end depicted in FIG. 6 includes a storage unit 8 having a RAM (random access memory) and a ROM (read-only memory) to store the programs including the fault notification program of the electronic device and the various data required to execute the programs for a series of processes executed by the fault detection means 1, the data generating means 2, the data dividing means 3, the data compression means 4, the identification information adding means 5 and the data transmission means 6.

Further, the device 10 at the transmitting end depicted in FIG. 6 includes a control unit 7 for collectively controlling the fault detection means 1, the data generating means 2, the data dividing means 3, the data compression means 4, the identification information adding means 5, the data transmission means 6 and the storage unit 8. The fault detection means 1, the data generating means 2, the data dividing means 3, the data compression means 4, the identification information adding means 5, the data transmission means 6, the storage unit 8 and the control unit 7 are interconnected through a bus line BL.

Preferably, the functions of the fault detection means 1, the data generating means 2, the data dividing means 3, the data compression means 4, the identification information adding means 5, the data transmission means 6, and the control unit 7 are realized by the CPU (or the processor) of a multipurpose computer executing the process of reading the fault notification program and other programs (software) stored in the storage unit 8. As a result, the device 10 at the transmitting end depicted in FIG. 6 requires no dedicated hardware for realizing the functions of the fault detection means 1, the data generating means 2, the data dividing means 3, the data compression means 4, the identification information adding means 5, the data transmission means 6 and the control unit 7.

Incidentally, a RAM or a ROM built in the CPU (or the processor) of the multipurpose computer may be used in place of the storage unit 8 included in the device 10 at the transmitting end.

The device 20 at the receiving end depicted in FIG. 6, on the other hand, includes a data receiving means 12 for receiving each of the plurality of the compressed division data transmitted from the electronic device, etc., an identification information extraction means 13 for retrieving the identification information (ID) added to the plurality of the compressed division data, a data restoration means 14 for executing the decoding process on the plurality of the compressed division data and restoring one data based on the identification information retrieved by the identification information extraction means 13, and a data decompression means 15 for retrieving the original attached file (AF) by decompressing the restored data.

Further, the device 20 at the receiving end depicted in FIG. 6 includes a primary analysis unit 18 for confirming the content of the fault occurrence notification and taking an appropriate action based on the identification information (ID) retrieved from any one of the plurality of the compressed division data.

In this primary analysis unit 18, the identification information added to one of the plurality of the compressed division data is retrieved at the time when the particular compressed division arrives at the information processing unit, so that the support personnel can confirm the content of the fault occurrence notification, and by going to repair the electronic device carrying the required replacement parts, can take an appropriate action quickly.

Further, the device 20 at the receiving end depicted in FIG. 6 includes a secondary analysis unit 19 for retrieving the original attached file (AF) by decoding and decompressing the plurality of the compressed division data after all of them are collected. The original attached file (AF), in addition to the fault summary information such as the type of the information, the information indicating the summary of the content of the fault, the information on the electronic device as a source of the fault and the information on the date/time of the fault occurrence, contains the log information required for the fault investigation to specify the faulty part and the faulty point of the electronic device, the information on the hardware and software configuration and the information on the environment of the electronic device.

This secondary analysis unit 19 permits the support personnel to make the detailed investigation on the fault of the electronic device based on the original attached file restored and thus quickly provide the proper maintenance service.

Further, the device 20 at the receiving end depicted in FIG. 6 includes a storage unit 17 including a RAM and a ROM for storing the programs including the fault content confirmation program for executing a series of the processing flow executed by the data receiving means 12, the identification information extraction means 13, the data restoration means 14 and the data decompression means 15, and the various data required to execute the programs.

Further, the device 20 at the receiving end depicted in FIG. 6 includes a control unit 16 for collectively controlling the data receiving means 12, the identification information extraction means 13, the data restoration means 14, the data decompression means 15 and the storage unit 17. The data receiving means 12, the identification information extraction means 13, the data restoration means 14, the data decompression means 15, the storage unit 17 and the control unit 16 are interconnected by a bus line BL.

Preferably, the functions of the data receiving means 12, the identification information extraction means 13, the data restoration means 14, the data decompression means 15 and the control unit 16 are realized by the CPU (or the processor) of a multipurpose computer which reads and executes the programs (software) including the fault content confirmation program stored in the storage unit 8. The device 20 at the receiving end depicted in FIG. 6, therefore, requires no dedicated hardware to realize the functions of the data receiving means 12, the identification information extraction means 13, the data restoration means 14, the data decompression means 15 and the control unit 16. Incidentally, in place of the storage unit 17 used in the device 20 at the receiving end in this case, the RAM or the ROM built in the CPU (or the processor) of the multipurpose computer may be used.

According to the embodiment depicted in FIG. 6, when the information processing unit receives the plurality of the compressed division data transmitted from the electronic device, the identification information is retrieved at the time point of arrival of any one of the plurality of the compressed division data at the information processing unit, even in the case where a part of the plurality of compressed division data is lost or delayed, or the plurality of the compressed division data are transmitted in a different order. As a result, the content of the fault occurrence notice and the electronic device which has developed the fault can be quickly, accurately identified while at the same time judging the degree of emergency of the information. Thus, the support personnel can take an appropriate measure against the fault based on the identification information.

Figure 7:
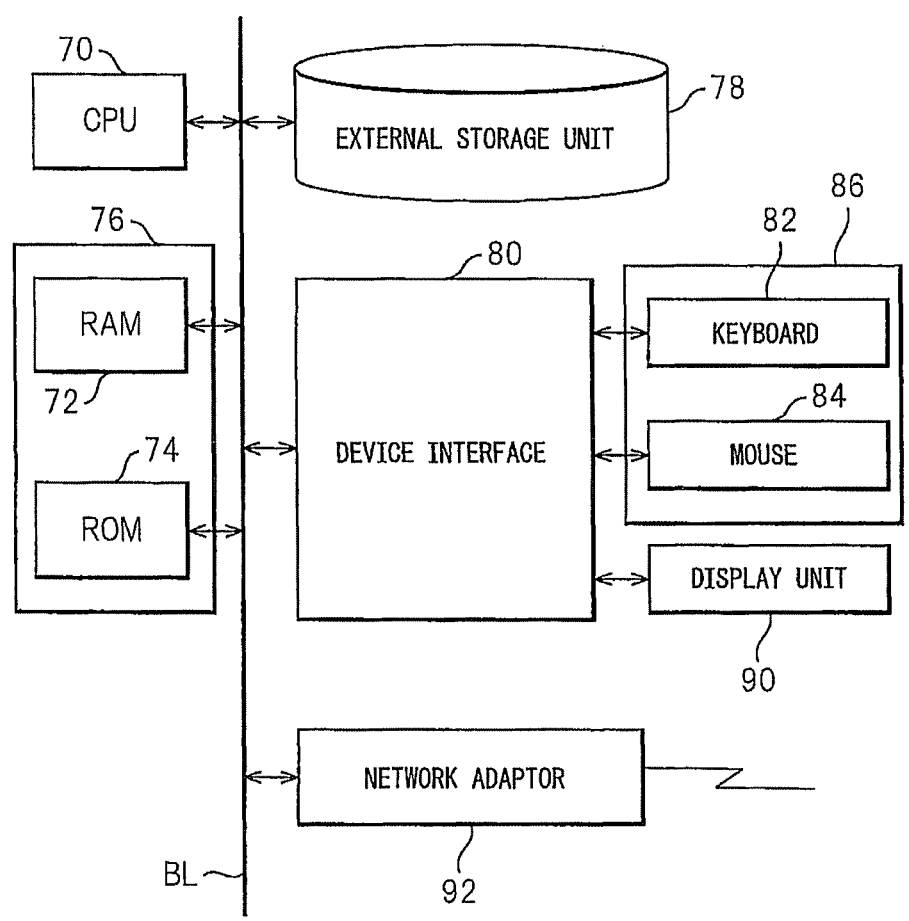
FIG. 7 is a block diagram depicting the hardware configuration of a computer for realizing the devices at the transmitting and receiving ends of the information processing system depicted in FIG. 6.

FIG. 7 is a block diagram depicting the hardware configuration of the computer for realizing the devices at the transmitting and receiving ends in the information processing system depicted in FIG. 6. In view of the fact that the device 10 at the transmitting end and the device 20 at the receiving end depicted in FIG. 6 have substantially the same hardware configuration, however, the description that follows deals with only the specific hardware configuration of the device 10 at the transmitting end directly related to the novel configuration of the invention as a typical case.

In FIG. 7, the fault detection means 1, the data generating means 2, the data dividing means 3, the data compression means 4, the identification information adding means 5, the data transmission means 6 and the control unit 7 of the device 10 at the transmitting end depicted in FIG. 6 are implemented by the CPU 70 of the computer. In other words, the functions of the fault detection means 1, the data generating means 2, the data dividing means 3, the data compression means 4, the identification information adding means 5, the data transmission means 6 and the control unit 7 are of the device 10 at the transmitting end are realized by causing the computer to execute the software (application).

Further, the hardware configuration depicted in FIG. 7 includes a storage unit 76 for storing the programs including the fault notification program for the electronic device to execute the processing flow according to this embodiment and the data related to the processing flow. This storage unit 76 substantially corresponds to the storage unit 8 depicted in FIG. 6 and is configured of a RAM 72 and a ROM 74. Incidentally, the RAM or the ROM built in the CPU 70 can be used as the storage unit 76.

Further, in the hardware configuration depicted in FIG. 7, it is desirable to prepare a hard disk or the like as a storage medium for holding the content of the programs described above. This hard disk or the like storage medium is driven by an external storage unit 78. Incidentally, the storage medium of this type is not limited to the one described above, but can be provided in the form of various storage media including a portable medium such as a floppy disk or a CD-ROM (compact disk read-only memory) or other fixed types of media.

Further, the hardware configuration depicted in FIG. 7 includes an input unit 86 having a keyboard 82 and a mouse 84. The operator (or the user) manipulates the keyboard and the mouse of the input unit 86, so that the information related to the fault and the data related to the processing flow selected by the operator himself are held in the storage unit 76 through a device interface 80.

Further, in the hardware configuration depicted in FIG. 7, the display unit 90 as a display is connected to the CPU 70 and the storage unit 76 through the device interface 80. The display unit 90 displays on the screen thereof, as required, the fault summary information such as the type of the information transmitted, the information indicating the summary of the content of the fault, the information on the original electronic device which has developed the fault and the information on the date/time when the fault occurred.

The CPU 70, the storage unit 76, the external storage unit 78 and the device interface 80 are interconnected through the bus line BL. Further, the device 10 at the transmitting end including the CPU 70, the storage unit 76, the external storage unit 78, the device interface 80, the input unit 86 and the display unit 90 can be connected to a device other than the information processing unit (device 20 at receiving end) through a network adaptor 92.

Figure 8:
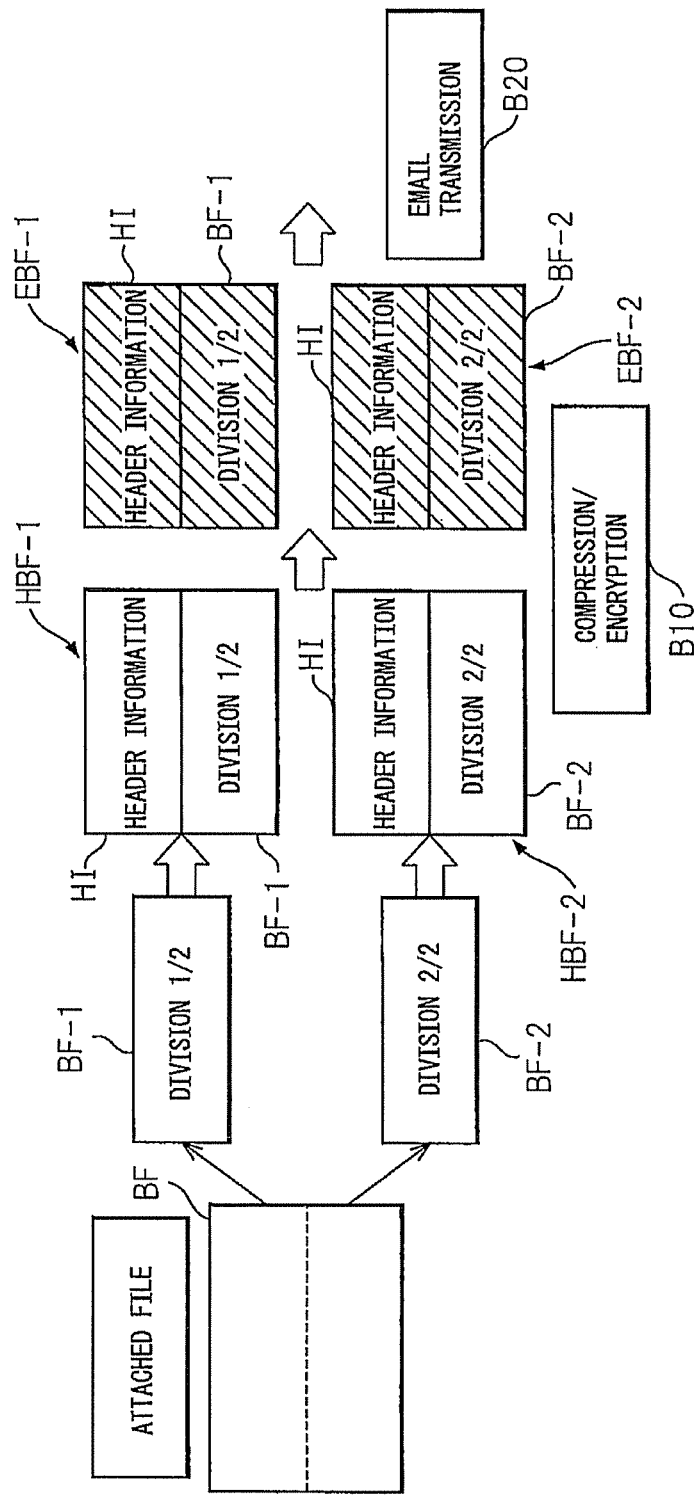
FIG. 8 is a data flowchart explaining the fault notification method for the information processing system according to an example of this embodiment.

FIG. 8 is a data flowchart for explaining the fault notification method for the information processing system according to this embodiment.

As depicted in the data flowchart of FIG. 8, in the case where the fault notification method for the electronic device is carried out by utilizing the information processing system according to the embodiment depicted in FIG. 6 (for example, by causing the CPU to read and execute the fault notification program for the electronic device stored in the storage unit of the information processing system), then the data including the content of the fault detected in the electronic device is generated as the original attached file BF.

Next, in the case where the data of the original attached file BF exceeds a predetermined capacity, the data of the original attached file BF is divided into a plurality of division data (for example, the division data (1/2) BF-1 and the division data (2/2) BF-2) in accordance with the RFC agreement.

Further, by adding the header information HI as the identification information to each of the plurality of the division data, a plurality of the division data with the header information (for example, the first division data HBF-1 with the header information and the second division data HBF-2 with the header information) are generated. This header information HI includes the fault summary information such as the type of the information transmitted, the information indicating the summary of the content of the fault, the information on the electronic device that has developed the fault and the information on the date/time of fault occurrence, the number of the division data (for example, 2) and the number indicating the order of division of the division data. Incidentally, the fault summary information poses no problem in handling the attached file or the text in the electronic mail.

Further, as depicted in block B10, the plurality of the division data with the header information are compressed and encrypted thereby to generate the plurality of the encrypted compressed division data with the header information (for example, the first encrypted compressed division data EBF-1 with the header information and the second encrypted compressed division data EBF-2 with the header information). In this case, although the attached file BF is divided into a plurality of division data in the stage before compression and decryption of the original attached file, the attached file BF may alternatively be divided into a plurality of division data, and after compressing each of the plurality of the division data, the plurality of the compressed division data may be encrypted with the identification information added thereto.

Further, as depicted in the block B20, the plurality of the encrypted compressed division data with the header information are transmitted by email through the network.

FIG. 9 is a flowchart explaining the processing flow in the device at the transmitting end of the information processing system depicted in FIG. 6, and FIG. 10 is a data format diagram depicting the content of the header information used in the information processing system depicted in FIG. 6. More specifically, the flowchart depicted in FIG. 9 illustrates the processing flow of the program for transmitting the plurality of the division data operating on the CPU of the computer.

In the flowchart of FIG. 9, as depicted in step S30, the original attached file (transmission data) is generated as the data including the content of the fault detected in the electronic device.

Next, step S31 judges whether the size of the original attached file is not less than a predetermined standard division value (size limit) or not. Upon judgment that the size of the original attached file is not less than the standard division value, the process proceeds to step S33, in which the attached file is divided into parts of a division size having the standard division value thereby to generate a plurality of attached files (a plurality of division data).

Further, as depicted in step S34, the header information is added as the identification information to each of the plurality of the attached files.

The content of the header information, as depicted in FIG. 10, includes the fault summary information such as the information on the date/time of the fault occurrence, the information on the device that has developed the fault (for example, the serial number of the electronic device as a source of the fault), the information on the notification serial number (the number attached to each notice in the device that has developed the fault), the information on the degree of emergency (high/middle/low: malfunction/warning/notice (Error/Warning/Information)) and the information on the content of the message in the fault occurrence notice (message indicating the fault/the outline of the notice) on the one hand, and the division file restoration information such as the information on the file name of the original attached file before division, the information indicating the order of division of the division data (the information indicating the number as counted from the first division data) and the number of division data (the total number of division data) on the other hand. Incidentally, the fault summary information can be used also to specify the same data in the same device (the same electronic device) among the plurality of the data.

Now, the explanation returns to the flowchart depicted in FIG. 9. As depicted in steps S35 and S36, a plurality of the division data with the header information are compressed and encrypted thereby to generate a plurality of the encrypted and compressed division data with the header information. Although the attached file is divided into a plurality of division data before compression and encryption of the original attached file in the case under consideration, the attached file may be divided into a plurality of division data, and then, after each of the plurality of the division data is compressed, each of the plurality of the compressed division data may be encrypted with the identification information added thereto.

Further, as depicted in step S37, each of the plurality of the encrypted and compressed division data with the header information is attached to the mail thereby to generate a plurality of the compressed division emails.

Finally, as depicted in step S38, the plurality of the compressed division mails having added thereto the plurality of the encrypted and compressed division data with header information are transmitted by email to the information processing unit thereby to accomplish the mail transmission.

Incidentally, regarding the method used herein to encrypt the plurality of division data, the standard method, such as S/MIME (Secure/Multipurpose Internet Mail Extensions) or PGP (Pretty Good Privacy) is used. As a result, in the case where the antivirus gateway introduced in the customer environment is operated with such a policy that the encrypted mail is not subjected to the virus scan upon judgment that the virus scan is impossible due to the "encrypted email", the plurality of the encrypted division data can pass the gateway without any problem.

FIG. 11 is a flowchart explaining the processing flow in the device at the receiving end of the information processing system depicted in FIG. 6. The flowchart of FIG. 11 depicts the processing flow of a program for causing the CPU of the computer to receive a plurality of the division data and retrieve the original attached file.

In the flowchart of FIG. 11, as depicted in step S40, the mail reception is accomplished by receiving the various emails transmitted from the electronic device.

Next, based on the header information, step S41 judges whether the received email is the compressed division mail or not. Upon judgment that the received email is the compressed division email, the process proceeds to step S42 to judge whether the plurality of the compressed division mails are all collected or not.

Further, as depicted in step S46, at the time point when all the compressed division emails are collected, all of these compressed division emails are combined to accomplish the email combination.

In the case where step S42 judges that all the compressed division emails are not yet collected, on the other hand, the process proceeds to steps S43 and S44, and at the time point when any one of the plurality of the compressed division emails is received, the particular compressed division data is decoded and decompressed.

Further, as depicted in step S45, by retrieving the header information added to the compressed division data, the content of the received fault occurrence notice, the device as a source of the fault and the date/time of fault occurrence are specified. Based on the header information retrieved in this way, the content of the fault occurrence notice is confirmed and the appropriate action can be taken.

Further, as depicted in steps S47 and S48, the electronic mail obtained by combining all the compressed division emails the data is subjected to the data restoration process and the decompression process.

Finally, as depicted in step S49, the original attached file is retrieved from the electronic mail subjected to the data restoration process and the decompression process. Based on the attached file retrieved in this way, the detailed investigation related to the fault of the electronic device is conducted, thereby making it possible to provide the proper maintenance service quickly.

This embodiment is applicable to the information processing system using a network, having the function in which upon detection of a fault in an electronic device such as a user device, a plurality of division data with the identification information which are obtained by dividing the attached file containing the information on the fault are transmitted to an information processing unit such as a maintenance center device, and also the function in which the identification information is retrieved at the time point when any one of the plurality of the division data arrives at the information processing unit, so that the content of the fault occurrence notice and the electronic device that has developed the fault can be quickly, accurately identified.

What is claimed is:

1. An electronic device comprising:
   a computer mounted in the electronic device, the computer including
      a fault detection unit configured to detect a fault occurred in the electronic device;
      a data generating unit configured to generate, as a data, the content of the fault detected by the fault detection unit;
      a data dividing unit configured to divide the generated data into a plurality of division data in the case where the data exceeds a predetermined capacity;
      a data compression unit configured to compress each of the plurality of the division data into a plurality of compressed division data;
      an identification information adding unit configured to add identification information concerning the detected fault to each of the plurality of the compressed division data; and
      a data transmission unit configured to transmit, through a network, each of the plurality of the compressed division data with the identification information added thereto,
   wherein the data transmission unit transmits the plurality of the compressed division data with information on emergency degree of the fault added thereto in a first email transmission session to a remote maintenance apparatus through a network and the identification information includes fault summary information constituting a summary of the content of the fault.

2. The electronic device according to claim 1, wherein the electronic device further includes an encryption unit configured to encrypt each of the plurality of the compressed division data.

3. The electronic device according to claim 1, wherein the identification information includes information required to restore the plurality of the compressed division data.

4. An information processing system having an electronic device for transmitting detected fault information through a network and an information processing unit for collecting the fault information of the electronic device, wherein
   said electronic device comprises:
      a fault detection unit configured to detect a fault occurred in the electronic device;
      a data generating unit configured to generate, as a data, the content of the fault detected by the fault detection unit;
      a data dividing unit configured to divide the generated data into a plurality of division data in the case where the data exceeds a predetermined capacity;
      a data compression unit configured to compress each of the plurality of the division data into a plurality of compressed division data;
      an identification information adding unit configured to add identification information concerning the detected fault occurred in the electronic device to each of the plurality of the compressed division data; and
      a data transmission unit configured to transmit, through a network, each of the plurality of the compressed division data with the identification information added thereto with information on emergency degree of the fault in a first email session to said information processing unit, the identification information including fault summary information constituting a summary of the content of the fault, and said information processing unit comprises:
- a data receiving unit configured to receive each of the plurality of the compressed division data transmitted thereto; and
- a data restoration unit configured to restore the plurality of the compressed division data into one data based on the identification information.

5. A fault notification method for an electronic device to transmit detected fault information through a network, the method comprising:
- detecting a fault occurred in the electronic device;
- generating the content of the detected fault as a data;
- dividing the generated data into a plurality of division data in the case where the data exceeds a predetermined capacity;
- compressing each of the plurality of the division data into a plurality of compressed division data;
- adding identification information concerning the detected fault of the electronic device to each of the plurality of the compressed division data; and
- transmitting, through a network, each of the plurality of the compressed division data with the identification information added thereto with information on emergency degree of the fault in a first email session to a remote maintenance apparatus, the identification information including fault summary information constituting a summary of the content of the fault.

6. The fault notification method according to claim 5, wherein the method further comprises encrypting each of the plurality of the compressed division data.

7. The fault notification method according to claim 5, wherein the identification information includes information required to restore the plurality of the division data.

8. A computer readable non-transitory storage medium containing a fault notification program for an electronic device having a processor to transmit detected fault information through a network, the program causing the processor to execute:
- detecting a fault occurred in the electronic device;
- generating the content of the detected fault as a data;
- dividing the generated data into a plurality of division data in the case where the data exceeds a predetermined capacity;
- compressing each of the plurality of the division data into a plurality of compressed division data;
- adding identification information concerning the detected fault of the electronic device to each of the plurality of the compressed division data; and
- transmitting, through a network, each of the plurality of the compressed division data with the identification information added thereto with information on emergency degree of the fault in a first email session to a remote maintenance apparatus, the identification information including fault summary information constituting a summary of the content of the fault.

9. The computer readable non-transitory storage medium according to claim 8, wherein the program further causes the processor to execute encrypting each of the plurality of the compressed division data.

10. The computer readable non-transitory storage medium according to claim 8, wherein the identification information includes information required to restore the plurality of the division data.

* * * * *